3,477,976
POLYESTER RESINS FROM METHY-CYCLO-
HEXENE TRICARBOXYLIC ACID, METHYL-
CYCLOHEXANE TRICARBOXYLIC ACID OR
ANHYDRIDE THEREOF AND PROCESS OF
MAKING THE SAME
Susumu Nakamuro, Itami-shi, and Tadashi Shibazaki, Hirakata-shi, Japan, assignors to Nippon Gohsei Kagaku Kogyo Kabushiki Kaisha, Osaka-shi, Japan, a corporation of Japan
No Drawing. Filed Mar. 20, 1968, Ser. No. 720,752
Claims priority, application Japan, Apr. 2, 1967, 42/20,868
Int. Cl. C08g 17/04, 17/16
U.S. Cl. 260—22
19 Claims

ABSTRACT OF THE DISCLOSURE

A thermosetting polyester resin having improved properties of impact strength, gloss, whiteness and crash resistance making it suitable for coating use if prepared by a process consisting in reacting methyl-cyclohexene-tricarboxylic acid, methyl-cyclohexane-tricarboxylic acid or anhydride thereof with a polyhydric alcohol.

BACKGROUND OF THE INVENTION

Hitherto it has been known that a polyester resin obtained by reacting trimellitic acid, a kind of tricarboxylic acid, with a polyhydric alcohol is useful as a raw material for coating composition. However, while such polyster resin as made from trimellitic acid may give a coating film having good properties such as high heat and weather resistance, it is not sufficient in some properties such as impact strength, gloss, whiteness and crack resistance when it is used for coating.

The polyester resin of the present invention can be obtained by reacting a tricarboxylic acid selected from the group consisting of methyl-cyclohexene-tricarboxylic acid, methyl-cyclohexane-tricarboxylic acid and anhydrides thereof with a polyhydric alcohol.

Methyl-cyclohexene-tricarboxylic anhydride is represented by the following formula:

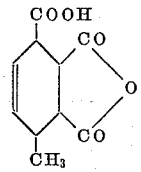

and may be prepared in good yield by reacting sorbic acid with maleic anhydride according to the following equation:

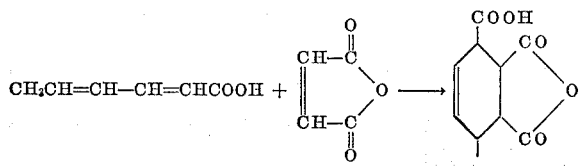

It may be hydrogenated with hydrogen to give methyl-cyclohexane-tricarboxylic anhydride. Said anhydrides may be hydrolyzed to give the corresponding free acids.

Kown aliphatic polyhydric alcohols having 2 or more hydroxyl groups may be employed as a polyhydric alcohol. Examples of these polyhydric alcohols are glycol, propyleneglycol, diethyleneglycol, triethyleneglycol, butyleneglycol, hexamethyleneglycol, neopentylglycol, glycerin, diglycerin, trimethylolethane, trimethylolpropane, 1,2,6-hexanetriol, pentaerythritol, sorbitol, dipentaerythritol and the like.

In the preparation of the polyester resin of the present invention, the reaction is carried out by contacting said tricarboxylic acids or anhydrides thereof with said polyhydric alcohols at about 150° C. while removing off the formed water. In such case, incorporation of dicarboxylic acids, monocarboxylic fatty acids, benzoic acid or para-tertiary-butyl benzoic acid may be advantageous for the control of the reaction rate and the viscosity of the product and the improvement of flexibility, impact strength and adhesion to a body of the coating film obtained from the product. However, the ratio of the tricarboxylic acid to the total carboxylic acids is at least 3%, preferably 5 to 50%, by number of carboxyl group. Examples of the dicarboxylic acid are phthalic anhydride, isophthalic acid, terephthalic acid, succinic acid, glutaric acid, adipic acid, suberic acid, sebacic acid, maleic anhydride, fumaric acid itaconic acid and the like. Examples of the monocarboxylic fatty acid are stearic acid, eleostearic acid, oleic acid, linolic acid, riciroleic acid, linolenic acid, lauri acid, myristic acid, caprylic acid, capric acid and the like. Materials which can form said fatty acids during the reaction, for example, linseed oil, cocoa-nut oil, tall oil, cotton seed oil, tung oil and the like may also be employed. If desired, a small amount of aliphatic monohydric alcohols, for example, propanol, butanol, hexanol, octanol, 2-ethylhexanol, stearyl alcohol, allyl alcohol, oleyl alcohol, nonyl alcohol, isodecyl alcohol, isotridecyl alcohol, lauryl alcohol and the like is used together with the polyhydric alcohol.

All the carboxylic acid and all the alcohol should be employed in the ratio of 1:0.8 to 1.5, preferably 1:1.0 to 1.3 by member of carboxyl group and hydroxyl group. If the ratio of the alcohol to the carboxylic acids is higher than said range the rate of condensation reaction is too slow, on the other hand if the ratio is lower the reaction mixture tends to gelation during the condensation reaction.

The ratio of unreacted carboxyl group to all the carboxyl groups may affect properties of the product. The acid value, defined as milligram number of potassium hydroxide required for neutralizing free carboxyl group in one gram of the polymer, is preferably 10 to 100, desirably 15 to 60.

Thus obtained reaction product is a viscous liquid which is soluble in alcohols, ketones and these mixtures with aliphatic or aromatic hydrocarbons. The reaction product can be converted into a water soluble polymer by neutralizing with a basic substance in an aqueous medium or a water soluble organic solvent such as alcohols, ketones, ether alcohols and the like. The use of volatile basic substances is preferred. Examples of the basic substances are ammonia, alkyl amines such as methyl amine, ethyl amine, diethyl amine, triethyl amine and butyl amine, alkanol amines such as monoethanol amine, diethanol amine, triethanol amine, propanol amine and amino-methylpropanol, pyridine, piperidine, morpholine and the like. After neutralization, pH value of the reaction mixture is preferably controlled at 6 to 9.

The reaction product and the water soluble resin introduced therefrom may be cured in the presence of oxygen or air with or without a hardener to give coating films. Examples of the hardner are cobalt acetate, cobalt linolate, manganese borate, manganese chloride, mangnese linolate, lead oxide, lead linolate and the like.

The polyester resin may be preferably modified with melamine-formaldehyde resin, guanamine-formaldehyde resin or urea-formaldehyde resin. Such modified resin has much higher hardness and may be cured even at lower temperature than those on unmodified polyester resin.

The polyester resin of the present invention has good stability for storage and is characterized by that it becomes water soluble before curing and it gives a coating film excellent in such properties as heat resistance, gloss, hardness, alkali-resistance and water resistance after curing, and, therefore, is very useful as not only coating composition for metal, paper, textile and board but also adhesive, finishing agent for textile, molding and the like.

It may be usually used in the form of an aqueous solution though it may also be used in the form of a solution in an organic solvent such as benzene, toluene, xylene, mineral spirit, solvent naphtha or the like.

The following examples serve to illustrate the various embodiments of the present invention, which do not limit the scope of the invention.

Example 1

A flask of one liter capacity, provided with a stirrer and a condenser connected with a decanter used for the separation of water formed during reaction, was charged with 210 g. of methyl-cyclohexene-tricarboxylic anhydride, 190 g. of diethyleneglycol and 40 g. of xylene. The mixture was heated at 180° C. in nitrogen atmosphere for 6 hours. The formed water was continuously taken out from the reaction zone in the form of azeotropic mixture with xylene and xylene was recycled to the reaction zone. After the reaction completed xylene was distilled off. The reaction product was a clear and light yellowish paste having acid value of 62. The Gardner-viscosity of a 50% solution of the resin in a mixture of xylene and butanol (60:40 by weight) at 20° C. was $Z_5$ to $Z_6$. The solution was casted on a tin plate and then cured at 200° C. for 20 minutes. Thus obtained film has pencil hardness of 3H, and even in the case said tin plate on which the film coated was bended until 180 degree angle along a circumference of mandrel of 3 mm. in diameter no crack on the film was observed.

On the other hand, 100 g. of the resin was dispersed into 100 g. of water by heating at 70° C. with agitation, and then after cooled, was neutralized with a 28% aqueous ammonia solution until pH value of the solution became to 6.5. A clear and viscous solution having viscosity of $Z_5$ to $Z_6$ was obtained. The solution was kept stable during storage for one month at 40° C.

A coating composition prepared by mixing 55 parts by solid weight of the aqueous solution and 45 parts by weight of titanium white in a ball-mill for 24 hours and diluted with water was sprayed on a steel plate treated previously with zinc phosphate and then was cured at 200° C. for 20 minutes to give a coated film having thickness of 30μ.

The properties of the film were as follows:

Pencil hardness _____ 4H
Adhesion _____ 100%
Erichsen value _____ 8.0 mm.
Impact resistance _____ 35 cm.
Gloss _____ 94.7%
Resistance for salt spray _____ Good

NOTES

*Pencil hardness.*—Shown by the hardness of the most hard pencil which cannot scratch on the tested film when the pencil is drawn on the filb at an inclination of 45 degrees and at a pressure of 1 kg.

*Adhesion.*—The coating film on a test panel is cut lengthwise and crosswise by 1 mm. interval, and peeled off with a sticking tape. The ratio of non-peeled area to the whole area is measured.

*Erichsen value.*—The test panel is pressed with 1 inch diameter punch by using Erichsen film tester.

*Impact resistance.*—Measured by a Du Pont impact tester employing a weight of 500 g. and a core having a hemispheric end of ½ inch in radius.

*Gloss.*—60°–60° reflection is measured with a glossmeter.

*Resistance for salt spray.*—A 5% aqueous solution of sodium chloride is sprayed on the tested film, and after 200 hours the appearance on the film is observed.

In the case a tin plate coated in the same manner as described before was bended, no crack of the coating film was observed.

Example 2

A mixture of 207 g. of methyl-cyclohexane-tricarboxylic anhydride, 73 g. of adipic acid and 207 g. of 1,3-butyleneglycol was heated in nitrogen atmosphere at 185° C. for 5 hours. The obtained resin has acid value of 46. The Gardner-viscosity of a 50% solution of the resin in a mixture of xylene and butanol (60:40 by weight at 20° C.) was $Z_4$ to $Z_5$.

The resin (100 g.) dispersed in 100 g. of water was neutralized with a concentrated aqueous ammonia solution until pH value of the solution became to 6.0 and was modified by adding 33 g. by solid weight of a water soluble melamine-formaldehyde resin. Thus obtained aqueous solution has the Gardner-viscosity of $Z_5$ and excellent storage-stability.

The coating composition prepared by mixing 50 parts by solid weight of the aqueous solution and 50 parts by weight of titanium white in a ball-mill for 24 hours and diluted with water was sprayed on a steel plate treated previously with zinc phosphate and then was cured at 150° C. for 20 minutes to give a coating film having thickness of 30μ.

The properties of the obtained film were as follows:

Pencil hardness _____ 5H
Adhesion _____ 80%
Erichsen value _____ 5.6 mm.
Impact resistance _____ 30 cm.
Gloss _____ 92.5%
Resistance for flexibility _____ Good Examples 3 to 11

In each case, the procedure in Example 2 was released with the exception that kinds and amounts of the starting materials, neutralizing agents and other additives were modified.

The properties of the obtained films are shown in the following table:

| Starting Material | Example Number | | | | |
|---|---|---|---|---|---|
| | 3 | 4 | 5 | 6 | 7 |
| Tricarboxylic acid: | | | | | |
| Name | MHeTA anhydride | MHeTA | MHaTA anhydride | MHaTA | MHeTA anhydride |
| Amount (g.) | 190 | 168 | 40 | 20 | 50 |
| Dicarboxylic acid: | | | | | |
| Name | Phthalic anhydride | Sebacic acid | Phthalic anhydride | Phthalic anhydride | Phthalic anhydride / Isophthalic acid / Adipic acid |
| Amount (g.) | 52 | 80 | 118 | 133 | 74 / 33 / 29 |
| Oil or fatty acid: | | | | | |
| Name | | | Cocoa-nut oil | Castor oil | Soybean oil |
| Amount (g.) | | | 107 | 148 | 84 |
| Polyhydric alcohol: | | | | | |
| Name | Neopentylglycol | Propylene glycol | Trimethylolethane | Glycerin | Pentaerythritol / Propyleneglycol |
| Amount (g.) | 187 | 91 | 120 | 92 | 82 / 38 |
| Monohydric alcohol: | | | | | |
| Name | | Trimethylol-propane | | | |
| Amount | | 54 | | | |
| Reaction condition: | | | | | |
| Temperature, °C | 180 | 185 | 190 | 190 | 185 |
| Time, hr | 4.5 | 6 | 5 | 4 | 5 |
| Acid value of the reaction condition | 58 | 52 | 55 | 69 | 47 |
| Neutralizing agent | Aqueous ammonia | Dimethylaminoethanol | Ethanolamine | Isopropylamine | Aqueous ammonia |
| Modifying resin: | | | | | |
| Name | Melamine | | Melamine urea (50/50) | Melamine | Acetoguanamine |
| Amount (percent by solid weight to the polyester) | 20 | | 25 | 25 | 20 |
| pH of the prepared aqueous solution | 6.0 | 6.3 | 6.0 | 6.0 | 6.5 |
| Pigment composition, Titanium white/resins (by solid weight) | 45/55 | 50/50 | 50/50 | 45/55 | 45/55 |
| Curing: | | | | | |
| Temperature, °C | 150 | 200 | 160 | 160 | 150 |
| Time, hr | 20 | 20 | 20 | 20 | 20 |
| Properties of film: | | | | | |
| Pencil hardness | 5H | 3H | 4H | 5H | 4H |
| Adhesion, percent | 80 | 100 | 90 | 86 | 96 |
| Ericksen value (mm.) | 4.5 | >8 | 4.8 | 4.4 | 6.8 |
| Resistance for flexibility | Good | Good | Good | Good | Good |
| Impact resistance (cm.) | 30 | 40 | 30 | 35 | 35 |
| Gloss, percent | 92.6 | 94.5 | 92.2 | 93.0 | 9.38 |
| Resistance for salt spray | Good | Good | Good | Good | Good |

| Starting Material | Example Number | | | | |
|---|---|---|---|---|---|
| | 8 | 9 | 10 | 11 | Control |
| Tricarboxylic acid: | | | | | |
| Name | MHeTA anhydride | MHeTA anhydride | MHeTA anhydride | MHeTA anhydride | Trimellitic anhydride. |
| Amount (g.) | 126 | 105 | 63 | 32 | 118. |
| Dicarboxylic acid: | | | | | |
| Name | Adipic acid | Succinic anhydride | Phthalic anhydride | Phthalic anhydride | Adipic acid. |
| Amount (g.) | 66 | 94 | 74 | 108 | 32.4. |
| Oil or fatty acid: | | | | | |
| Name | | Tung oil | Cocoa-nut oil | Cocoa-nut fatty acid | |
| Amount (g.) | | 85 | 86 | 108 | |
| Polyhydric alcohol: | | | | | |
| Name | Trimethylolpropane | Pentaerythritol | Ethylene glycol / Glycerin | Trimethylol-propane | 1,3-butylene-glycol. |
| Amount (g.) | 135 | 177 | 62 / 23 | 122 | 140. |
| Monohydric alcohol: | | | | | |
| Name | Lauryl alcohol | 2-ethylhexanol | | | |
| Amount (g.) | 45 | 26 | | | |
| Reaction condition: | | | | | |
| Temperature, °C | 180 | 190 | 185 | 185 | 180. |
| Time, hr | 4 | 6 | 8 | 9 | 4. |
| Acid value of the reaction condition | 66 | 42 | 27 | 20 | 60. |
| Neutralizing agent | Morpholine | Aminomethylpropanol | Ethanolamine | Dimethylamino ethanol | Dimethylamino ethanol. |
| Modifying resin: | | | | | |
| Name | | Melamine | Melamine | Melamine | Melamine. |
| Amount (percent by solid weight to the polyester) | | 25 | 20 | 20 | 20. |
| pH of the prepared aqueous solution | 6.5 | 6.0 | 6.5 | 6.5 | 6.5. |
| Pigment composition, titanium white/resins (by solid weight) | 45/55 | 50/50 | 45/55 | 45/55 | 45/55. |
| Curing: | | | | | |
| Temperature, °C | 180 | 180 | 170 | 180 | 180. |
| Time, hr | 20 | 20 | 20 | 20 | 20. |
| Properties of film: | | | | | |
| Pencil hardness | 4H | 5H | 4H | 4H | 4H. |
| Adhesion, percent | 100 | 82 | 92 | 95 | 80. |
| Erichsen value (mm.) | >8 | 4.0 | 6.4 | 7.0 | 4.0. |
| Resistance for flexibility | Good | Good | Good | Good | Good. |
| Impact resistance (cm.) | 40 | 30 | 35 | 40 | 28. |
| Gloss, percent | 94.2 | 93.5 | 94.0 | 94.5 | 90.0. |
| Resistance for salt spray | Good | Good | Good | Good | Good. |

NOTE.—MHeTA equals Methyl-cyclohexene-tricarboxylic acid.
MHaTA equals Methyl-cyclohexane-tricarboxylic acid.

What we claim is:

1. A polyester resin prepared by reacting a tricarboxylic acid selected from the group consisting of methyl-cyclohexene-tricarboxylic acid, methyl cyclohexane-tricarboxylic acid and anhydrides thereof with a polyhydric alcohol.

2. A polyester resin as claimed in claim 1 in which the polyhydric alcohol is a member of the group consisting of ethyleneglycol, propyleneglycol, diethyleneglycol, triethyleneglycol, butyleneglycol, hexamethyleneglycol, neopentylglycol, glycerin, diglycerin, trimethylolethane, trimethylolpropane, 1,2,6-hexatriol, pentarythritol, sorbitol and dipentaerythritol.

3. A polyester resin as claimed in claim 1 wherein a member of the group consisting of dicarboxylic acid, monocarboxylic fatty acids, glycerides of monocarboxylic fatty acids, benzoic acid and para-tertiary butyl benzoic acid is used together with the tricarboxylic acid and mixtures thereof.

4. A polyester resin as claimed in claim 3 in which the dicarboxylic acid is a member of the group consisting of phthalic anhydride, isophthalic acid, terephthalic acid, succinic acid, glutaric acid, adipic acid, suberic acid, sebacic acid, maleic anhydride, fumaric acid and itaconic acid.

5. A polyester resin as claimed in claim 3 in which the monocarboxylic fatty acid is a member of the group consisting of stearic acid, eleostearic acid, oleic acid, linolic acid, ricinoleic acid, linolenic acid, lauric acid, myristic acid, caprylic acid and capric acid.

6. A polyester resin as claimed in claim 3 wherein a glyceride of monocarboxylic fatty acid is used.

7. A polyester resin as claimed in claim 6, in which the glyceride is a member of the group consisting of linseed oil, cocoa-nut oil, tall oil, cotton seed oil and tung oil.

8. A polyester resin as claimed in claim 1 wherein a monohydric alcohol is used together with the polyhydric alcohol.

9. A polyester resin as claimed in claim 8 in which the monohydric alcohol is a member of the group consisting of propanol, butanol, hexanol, octanol, 2-ethylhexanol, stearyl alcohol, allyl alcohol, oleyl alcohol, noyl alcohol, isodecyl acohol, isotridecyl alcohol and lauryl alcohol.

10. A polyester resin as claimed in claim 1 in which the polyester resin has acid value of 10 to 100.

11. A process for preparing a polyester resin which comprises reacting a tricarboxylic acid selected from the group consisting of methyl-cyclohexene-tricarboxylic acid, methyl-cyclohexane-tricarboxylic acid and anhydrides, thereof with a polyhydric alcohol.

12. A process as claimed in claim 11 wherein the ratio of the numbers of carboxyl group on carboxylic acids and hydroxyl group on alcohols is 1:0.8 to 1.5.

13. A process as claimed in claim 11 wherein the reaction is carried out at a temperature in the range from 150 to 220° C.

14. A process for preparing a water soluble polyester resin which comprises reacting a tricarboxylic acid selected from the group consisting of methyl-cyclohexenetricarboxylic acid, methyl-cyclohexane-tricarboxylic acid and anhydrides thereof with a polyhydric alcohol and then neutralizing the product with a volatile basic substance.

15. A process as claimed in claim 14 in which the volatile basic substance is a member of the group consisting of ammonia, methyl amine, ethyl amine, triethyl amine, butyl amine, monoethanol amine, diethanol amine, triethanol amine, propanol amine, aminomethylpropanol, morpholine, pyridine and piperidine.

16. A process as claimed in claim 14 wherein the neutralization is carried out until pH value of the reaction mixture becomes 6 to 9.

17. A polyester resin as claimed in claim 1 wherein a hardner selected from the group consisting of cobalt acetate, cobalt linolate, manganese borate, manganese chloride, manganese linolate, lead oxide and lead linolate is added.

18. A polyester resin as claimed in claim 1 wherein a member of the group consisting of melamine-formaldehyde resin, guanamide-formaldehyde resin and urea-formaldehyde resin is incorporated.

19. A coating composition which comprises 35 to 65 parts by weight of the polyester resin prepared by reacting a tricarboxylic acid selected from the group consisting of methyl-cyclohexene-tricarboxylic acid, methyl-cyclohexane-tricarboxylic acid and anhydrides thereof with a polyhydric alcohol and 65 to 35 parts by weight of pigment.

References Cited
UNITED STATES PATENTS

| | | | |
|---|---|---|---|
| 2,562,878 | 8/1951 | Blair | 260—75 |
| 2,686,164 | 8/1954 | Arvin et al. | 260—22 |
| 2,915,486 | 12/1959 | Shelley | 260—21 |
| 3,077,459 | 2/1963 | Hershey et al. | 260—22 |
| 3,223,666 | 12/1965 | Bolton | 260—29.2 |
| 3,412,056 | 11/1968 | Crawford et al. | 260—22 |

HOSEA E. TAYLOR, Jr., Primary Examiner

R. W. GRIFFIN, Assistant Examiner

U.S. Cl. X.R.

117—132, 161; 260—20, 21, 26, 29.2, 29.4, 32.4, 32.6, 32.8, 33.4, 33.6, 40, 75, 76, 77, 843, 850, 863